United States Patent
Yokoi

(10) Patent No.: US 8,554,019 B2
(45) Date of Patent: Oct. 8, 2013

(54) APPARATUS AND METHOD FOR IMAGE PROCESSING

(75) Inventor: Hiromi Yokoi, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 158 days.

(21) Appl. No.: 12/986,167

(22) Filed: Jan. 6, 2011

(65) Prior Publication Data

US 2011/0170803 A1    Jul. 14, 2011

(30) Foreign Application Priority Data

Jan. 14, 2010 (JP) ................. 2010-005563

(51) Int. Cl.
    *G06K 9/32* (2006.01)
(52) U.S. Cl.
    USPC ........................................... 382/300
(58) Field of Classification Search
    None
    See application file for complete search history.

(56) References Cited

U.S. PATENT DOCUMENTS

| | | | | |
|---|---|---|---|---|
| 5,991,463 A * | 11/1999 | Greggain et al. | ............ | 382/298 |
| 6,002,810 A * | 12/1999 | Wakisawa et al. | ............ | 382/298 |
| 6,614,553 B2 * | 9/2003 | Nakami et al. | ................. | 358/1.2 |
| 7,945,118 B2 * | 5/2011 | Hanamoto et al. | ............ | 382/298 |
| 8,005,318 B2 * | 8/2011 | Ou et al. | ........................ | 382/298 |
| 2005/0094899 A1 * | 5/2005 | Kim et al. | ..................... | 382/300 |
| 2005/0249437 A1 * | 11/2005 | Wang et al. | .................... | 382/300 |
| 2008/0025622 A1 * | 1/2008 | Hanamoto et al. | ............ | 382/235 |
| 2008/0039960 A1 * | 2/2008 | Kadir et al. | ...................... | 700/73 |
| 2009/0324136 A1 * | 12/2009 | Yamada et al. | ............... | 382/300 |

FOREIGN PATENT DOCUMENTS

| JP | 6-38024 A | 2/1994 |
|---|---|---|
| JP | 2008-33692 A | 2/2008 |

OTHER PUBLICATIONS

Hou-Chun Ting and Hsueh-Ming Hang, Spatially Adaptive Interpolation of Digital Images Using Fuzzy Inference, Mar. 1996, Proceedings SPIE Visual Communications and Image Processing, vol. 2727, pp. 1206-1217.*

* cited by examiner

*Primary Examiner* — David Zarka
*Assistant Examiner* — Carol Wang
(74) *Attorney, Agent, or Firm* — Fujitsu Patent Center

(57) ABSTRACT

An image processing apparatus for generating an enlarged image obtained by enlarging an original image. The image processing apparatus includes a change rate calculation unit which calculates a first pixel change rate at a first pixel position of the original image and a second pixel change rate at a second pixel position of the original image; and a pixel value calculation unit which calculates a pixel value at an interpolation position to be interpolated between the first pixel position and the second pixel position of the original image according to an enlargement of the original image, based on the first pixel change rate weighted by a first weight according to the interpolation position and the second pixel change rate weighted by a second weight according to the interpolation position.

13 Claims, 17 Drawing Sheets

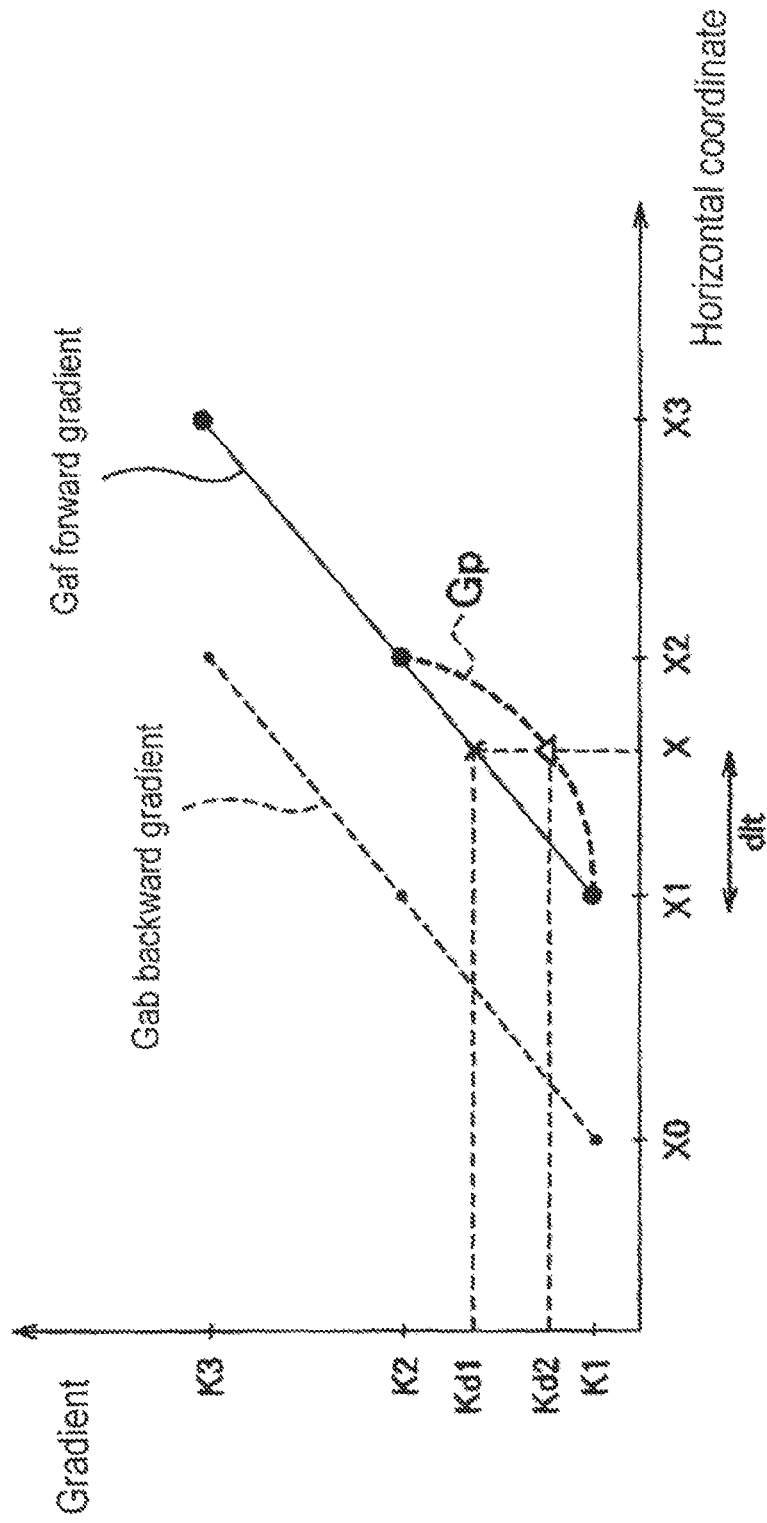
FIG. 4 Explanation diagram of the present embodiment (part 2)

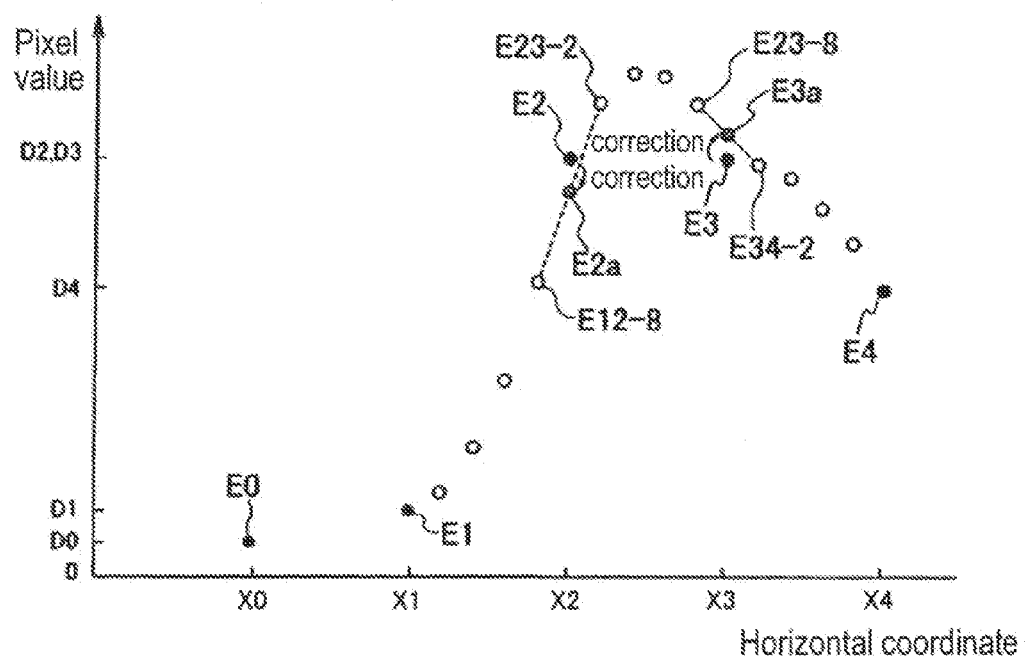

FIG. 6

Explanation diagram of the application example 1 (part 1)

| Horizontal coordinate | Pixel values | (Differences from the backward adjacent pixel) |
|---|---|---|
| 1 | 0 | 2 |
| 2 | 2 | 3 |
| 3 | 5 | 15 |
| 4 | 20 | 80 |
| 5 | 100 | 150 |
| 6 | 250 | -110 |
| 7 | 140 | 20 |
| 8 | 160 | |

FIG. 7    Explanation diagram of the application example 1 (part 2)

| Horizontal coordinate | Distance | Gradients (K1) at the forward adjacent pixel | Gradients (K2) at the backward adjacent pixel | Predicted gradients (Kd) | Predicted pixel values | After correction | Nearest Neighbor | |
|---|---|---|---|---|---|---|---|---|
| 4 | | | | | | | (4) | 20 |
| 4.2 | 0.2 | 15 | 80 | No change → 28 | 20 | 20 | (4) | 20 |
| 4.4 | 0.4 | 15 | 80 | 41 | 25.6 | 25.6 | (4) | 20 |
| 4.6 | 0.6 | 15 | 80 | 54 | 36.4 | 36.4 | (5) | 100 |
| 4.8 | 0.8 | 15 | 80 | 67 | 52.4 | 52.4 | (5) | 100 |
| 5 | | | | | 73.6 | 73.6 | | |
| 5.2 | 0.2 | 80 | 150 | No change → 94 | 100 | 98.2 | (5) | 100 |
| 5.4 | 0.4 | 80 | 150 | 108 | 118.8 | 118.8 | (5) | 100 |
| 5.6 | 0.6 | 80 | 150 | 122 | 143.2 | 143.2 | (5) | 100 |
| 5.8 | 0.8 | 80 | 150 | 136 | 173.2 | 173.2 | (6) | 250 |
| 6 | | | | | 208.8 | 208.8 | (6) | 250 |
| 6.2 | 0.2 | 150 | −110 | No change → 98 | 250 | 239.2 | (6) | 250 |
| 6.4 | 0.4 | 150 | −110 | 46 | 269.6 | 269.6 | (6) | 250 |
| 6.6 | 0.6 | 150 | −110 | −6 | 268.4 | 268.4 | (6) | 250 |
| 6.8 | 0.8 | 150 | −110 | −58 | 246.4 | 246.4 | (7) | 140 |
| 7 | | | | | 203.8 | 203.8 | (7) | 140 |
| 7.2 | 0.2 | −110 | 20 | No change → −84 | 140 | 163.4 | (7) | 140 |
| 7.4 | 0.4 | −110 | 20 | −58 | 123.2 | 123.2 | (7) | 140 |
| 7.6 | 0.6 | −110 | 20 | −32 | 116.8 | 116.8 | (8) | 140 |
| 7.8 | 0.8 | −110 | 20 | −6 | 120.8 | 120.8 | (8) | 140 |
| 8 | | | | No change → | 135.2 | 135.2 | (8) | 140 |
| | | | | | 160 | 160 | | |

FIG. 9

Explanation diagram of the application example 2 (part 1)

| Horizontal coordinate | Pixel values | (Differences from the backward adjacent pixel) |
|---|---|---|
| 1 | 0 | 2 |
| 2 | 2 | 3 |
| 3 | 5 | 95 |
| 4 | 100 | 0 |
| 5 | 100 | -50 |
| 6 | 50 | 0 |
| 7 | 50 | 20 |
| 8 | 70 | |

FIG. 10  Explanation diagram of the application example 2 (part 2)

| Horizontal coordinate | Distance | Gradients (K1) at the forward adjacent pixel | Gradients (K2) at the backward adjacent pixel | Predicted gradients (Kd) | Predicted pixel values | After correction | Nearest Neighbor | |
|---|---|---|---|---|---|---|---|---|
| 3 | | | | | 5 | 5 | (3) | 5 |
| 3.2 | 0.2 | 3 | 95 | No change → 21.5 | 9.28 | 9.28 | (3) | 5 |
| 3.4 | 0.4 | 3 | 95 | 39.8 | 20.92 | 20.92 | (3) | 5 |
| 3.6 | 0.6 | 3 | 95 | 58.2 | 39.92 | 39.92 | (4) | 100 |
| 3.8 | 0.8 | 3 | 95 | 76.6 | 66.28 | 66.28 | (4) | 100 |
| 4 | | | | | 100 | 90.74 | (4) | 100 |
| 4.2 | 0.2 | 95 | 0 | No change → 76 | 115.2 | 115.2 | (4) | 100 |
| 4.4 | 0.4 | 95 | 0 | 57 | 122.8 | 122.8 | (4) | 100 |
| 4.6 | 0.6 | 95 | 0 | 38 | 122.8 | 122.8 | (5) | 100 |
| 4.8 | 0.8 | 95 | 0 | 19 | 115.2 | 115.2 | (5) | 100 |
| 5 | | | | | 100 | 106.6 | (5) | 100 |
| 5.2 | 0.2 | 0 | −50 | No change → −10 | 98 | 98 | (5) | 100 |
| 5.4 | 0.4 | 0 | −50 | −20 | 92 | 92 | (5) | 100 |
| 5.6 | 0.6 | 0 | −50 | −30 | 82 | 82 | (6) | 50 |
| 5.8 | 0.8 | 0 | −50 | −40 | 68 | 68 | (6) | 50 |
| 6 | | | | | 50 | 55 | (6) | 50 |
| 6.2 | 0.2 | −50 | 0 | No change → −40 | 42 | 42 | (6) | 50 |
| 6.4 | 0.4 | −50 | 0 | −30 | 38 | 38 | (6) | 50 |
| 6.6 | 0.6 | −50 | 0 | −20 | 38 | 38 | (7) | 50 |
| 6.8 | 0.8 | −50 | 0 | −10 | 42 | 42 | (7) | 50 |
| 7 | | | | | 50 | 46.4 | (7) | 50 |
| 7.2 | 0.2 | 0 | 20 | No change → 4 | 50.8 | 50.8 | (7) | 50 |
| 7.4 | 0.4 | 0 | 20 | 8 | 53.2 | 53.2 | (8) | 50 |
| 7.6 | 0.6 | 0 | 20 | 12 | 57.2 | 57.2 | (8) | 50 |
| 7.8 | 0.8 | 0 | 20 | 16 | 62.8 | 62.8 | (8) | 50 |
| 8 | | | | No change → | 70 | 70 | (8) | 50 |

Explanation diagram explaining the changeover of the change rate calculation method In case of the Bilinear method In case of the Nearest Neighbor method Explanation diagram explaining two-dimensional enlargement processing according to the present embodiment

APPARATUS AND METHOD FOR IMAGE PROCESSING

CROSS-REFERENCE TO RELATED APPLICATIONS

This application is based upon and claims the benefit of priority of the prior Japanese Patent Application No. 2010-005563, filed on Jan. 14, 2010, the entire contents of which are incorporated herein by reference.

FIELD

The embodiments discussed herein is related to an apparatus and a method for image processing.

BACKGROUND

With regard to algorithm for image enlargement processing, there are nearest neighbor method, bilinear method, bicubic method, and so on.

First, the nearest neighbor method inverse-transforms pixel coordinates of a transformation target into pixel coordinates of a transformation source, and lets the value of a pixel in the most vicinity be the pixel value of transformation target. Although transformation is simple, the method produces degraded image quality having a conspicuous jaggy etc.

Further, the bilinear method inverse-transforms pixel coordinates of a transformation target into pixel coordinates of a transformation source, and obtains the pixel value of transformation target by performing linear interpolation among 4 (=2×2) pixels in the vicinity. Although a jaggy is not conspicuous, the enlarged image gives an impression that it is a blurred. This is because the image is generated using a weighted average of 4 pixels in the vicinity.

Also, the bicubic method inverse-transforms pixel coordinates of the transformation target into pixel coordinates of transformation source, and performs interpolation by use of a cubic equation from 16 (=4×4) pixels in the vicinity. In comparison with the bilinear method, the bicubic method requires a large calculation amount, causing a low processing speed, although an image blur may be suppressed.

Further, with regard to an image enlargement processing technique, for example an "image processing apparatus and a control method therefor" is disclosed in the official gazette of the Japanese Laid-open Patent Publication No. 2008-33692. According to the above conventional example, in order to maintain the sharpness of an original image while restraining the occurrence of noise, first, a smoothed image data is generated in addition to an enlarged image data. Then, an emphasis coefficient is multiplied by a difference image data which is obtained by subtracting between the above two data. Thereafter, by adding the above multiplied result to the enlarged image data, the enlarged image is obtained. In short, the above technique is to perform unsharp mask processing upon the data after enlargement processing. For the image enlargement processing, the bicubic method is mainly used.

Further, as a proposal for image enlargement processing algorithm, for example, an "image processing apparatus" is disclosed in the official gazette of the Japanese Laid-open Patent Publication No. 06-38024. In this conventional example, in order to obtain an enlarged image in which the sharpness is preserved in an edge portion, a gradation change rate of an interpolated pixel is adjusted according to the degree of gradation change between adjacent pixels. Then, according to the above adjusted change rate, the gradation of the interpolated pixel is obtained. Typically, the following methods are exemplified: (1) to adjust the change rate from a gradation difference between adjacent pixels; (2) to adjust the change rate in consideration of the direction (positive or negative) of the gradation change, which is obtained from a gradation difference between adjacent pixels and also from a backward pixel; and (3) to adjust the change rate from a gradation difference between adjacent pixels after edge enhancement processing.

SUMMARY

According to a first aspect of the embodiment, an image processing apparatus for generating an enlarged image obtained by enlarging an original image includes: a change rate calculation unit which calculates a first pixel change rate at a first pixel position of the original image and a second pixel change rate at a second pixel position of the original image; and a pixel value calculation unit which calculates a pixel value at an interpolation position to be interpolated between the first pixel position and the second pixel position according to an enlargement of the original image, based on the first pixel change rate weighted by a first weight according to the interpolation position and the second pixel change rate weighted by a second weight according to the interpolation position.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is an explanation diagram (part 2) schematically explaining the generation of a pixel value according to the embodiment.

FIG. 5A is an explanation diagram schematically explaining pixel value correction processing performed in a pixel value corrector.

FIG. 6 is an explanation diagram (part 1) exemplifying the image data of an original image in an application example 1.

FIG. 7 is an explanation diagram (part 2) exemplifying a pixel value calculation process and a resultant numeric value table, according to the application example 1.

FIG. 9 is an explanation diagram (part 1) exemplifying the image data of an original image in the application example 2.

FIG. 10 is an explanation diagram (part 2) exemplifying a pixel value calculation process and a resultant numeric value table, according to the application example 2.

DESCRIPTION OF EMBODIMENTS

Preferred embodiments of the image processing apparatus and the image processing method according to the present invention will be explained in detail by reference to the accompanied drawings.

As described above, as general methods for image enlargement processing, there are the nearest neighbor method, the bilinear method, and the bicubic method. However, each method has its merits and demerits. Namely, when the nearest neighbor method or the bilinear method, each having a small calculation amount, is applied, there is a problem in the image quality that a jaggy, a blur, and the like are produced. In contrast, when the bicubic method, producing higher image quality, is applied, a calculation amount is large, causing a low processing speed.

Further, in the Japanese Laid-open Patent Publication No. 06-38024, there is a situation that it is difficult to obtain an appropriate balance between edge enhancement processing and enlargement processing. Namely, if enlargement is processed upon image data after edge enhancement processing, an enhanced edge portion once having been obtained becomes smooth.

According to the one aspect of the present embodiments, there is a merit that pixel enhancement at the interpolation position is made when enlarging the image.

[Embodiment 1]

Figure 1:
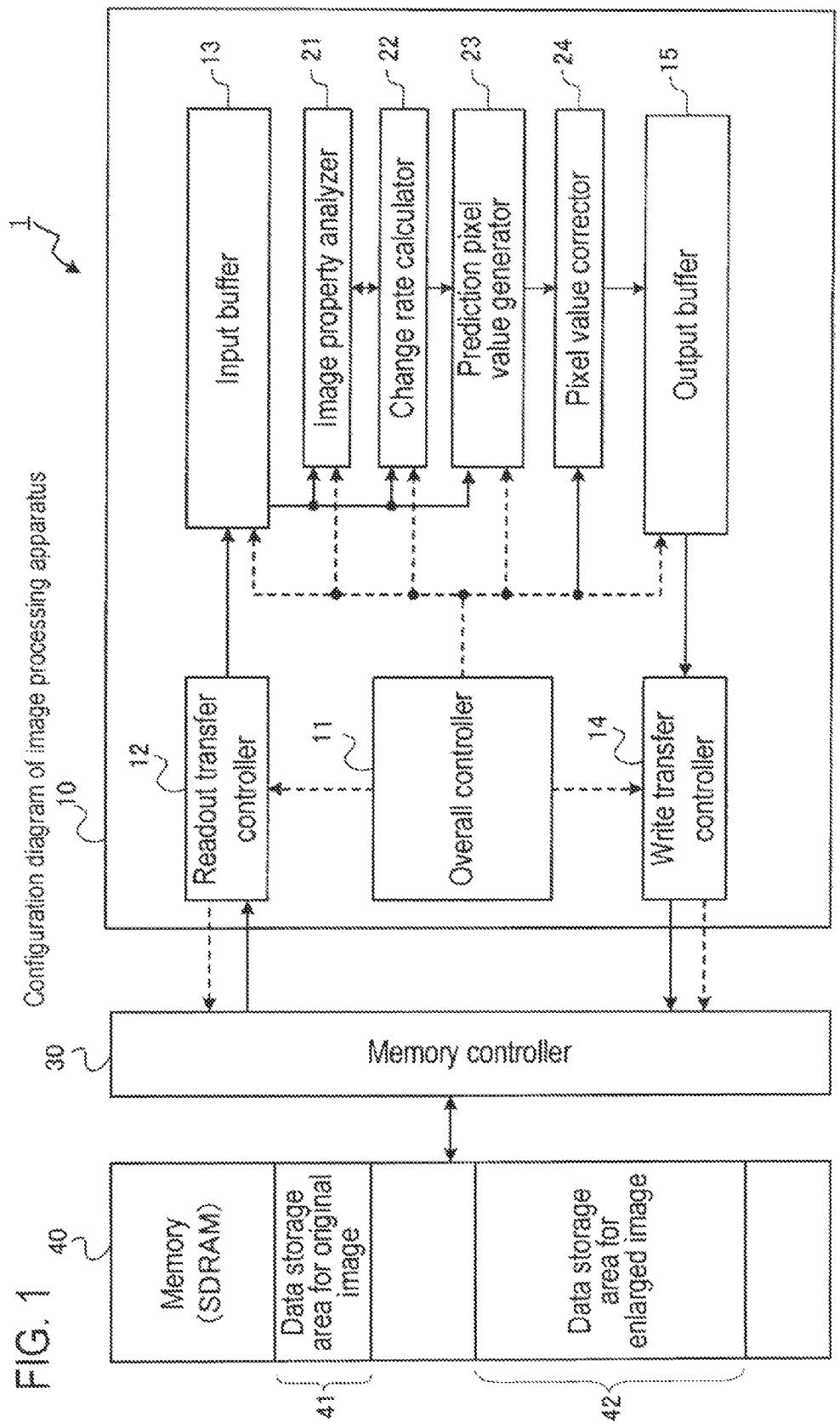
FIG. 1 is a configuration diagram of an image processing apparatus according to one embodiment.

FIG. 1 is a configuration diagram of an image processing apparatus 1 according to one embodiment. In FIG. 1, the image processing apparatus according to the present embodiment includes an image processing circuit 10, a memory 40 embodied with an SDRAM (synchronous DRAM) etc., and a memory controller 30 for performing access control to the memory 40.

Here, the image processing circuit 10 is provided to generate an enlarged image produced by enlarging an original image in one direction. The image processing circuit 10 includes overall controller 11, readout transfer controller 12, input buffer 13, write transfer controller 14, output buffer 15, image property analyzer 21, change rate calculator 22, prediction pixel value generator 23, and pixel value corrector 24.

In the following, an interface with a user or another image processing apparatus etc. for inputting an image data of the original image and for setting an enlargement ratio is not particularly specified. Instead, a description is given on the assumption that the original image data and the enlargement ratio are input and notified to the image processing apparatus of interest via a certain means. Also, it is assumed that the original image data is stored in a data storage area 41 for original image of the memory 40, and the image data after the enlargement processing by the image processing circuit 10 is stored in a data storage area 42 for enlarged image of the memory 40.

First of all, the overall controller 11 controls the operation of each configuration element in the image processing circuit 10. Also, the overall controller 11 processes the transformation of the pixel coordinates of the enlarged image into the coordinates of the original image. Additionally, an image enlarged by the image processing circuit 10 according to the present embodiment is generated in one direction. Assuming the enlargement processing in the horizontal direction, the number of pixels in each line of the enlarged image equals the number of pixels in the original image multiplied by the enlargement ratio. Therefore, the pixel coordinate of the enlarged image may be obtained from the calculation based on a pitch between pixels, for example, where the pitch is obtained by dividing a length of one line on the coordinate of the original image by the pixel number (the pixel number per line of the original image) multiplied by the enlargement ratio.

Further, the readout controller 12 reads out the original image data from the memory 40 based on the instruction from the overall controller 11, and stores the readout image data into the input buffer 13. According to the present embodiment, the readout/write of the memory 40 is performed using burst transfer. For example, the readout transfer controller 12 reads out the original image data by notifying the memory controller 30 of a readout top address and a data length, so that the readout data are stored into the input buffer 13.

Therefore, the input buffer 13 has at least as much capacity as the data amount stored during one-time burst transfer. Additionally, in order to reduce a waiting time in the image property analyzer 21, the change rate calculator 22, the prediction pixel value generator 23 and the pixel value corrector 24, it is preferable to divide the input buffer 13 into a first and a second area, each having the above capacity. Namely, when processing for pixels stored in one area is completed and shifted to processing for pixels stored in the other area, readout from the memory 40 and storage to the one area may be performed by the next burst transfer. Then, a bottleneck time produced by the memory readout may be reduced in the overall processing.

Further, based on the instruction from the overall controller 11, the write transfer controller 14 reads out from the output buffer 15 the image data after enlargement processing, and stores the readout data into the memory 40. Namely, the write transfer controller 14 notifies the memory controller 30 of a write top address and a data length, and then writes the enlarged image data into the memory 40. Therefore, the output buffer 15 has at least as much memory capacity as the data amount stored during one-time burst transfer. Also, in order to reduce a bottleneck time caused by the memory writing, it is preferable to divide the output buffer 15 into a first and a second area, each having the above memory capacity, similar to the case of the input buffer 13.

Further, in regard to the post-transformed coordinate of the enlarged image in the original image, which is indicated from the overall controller 11, the change rate calculator 22 first reads out from the input buffer 13 the pixel values of 3 pixels in the vicinity, including adjacent 2 pixels (2 pixels adjacent to the post-transformed coordinate), of the post-transformed coordinate. Then, based on the pixel values of these 3 pixels, the change rate calculator 22 obtains each pixel change rate of the adjacent 2 pixels. In other words, the change rate calculator 22 performs processing of a change rate calculation unit (change rate calculation step) described in the claims of the present embodiment.

Next, the pixel change rate at the post-transformed coordinate is estimated on the basis of the pixel change rate of the adjacent 2 pixels. The estimated pixel change rate is used by the pixel value calculation unit (pixel value calculation step) described in the claims. The pixel value calculation unit may perform this function (i.e. estimating the pixel change rate). In regard to the pixel change rate at the interpolation position, which is interpolated between the first pixel position of the original image and the second pixel position of that according to the enlargement of the original image, the above function corresponds to performing a first weighting and a second weighting according to the interpolation position.

Typically, the change rate calculator 22 approximates the transition of the pixel change rate between the adjacent 2 pixels, located in the vicinity of the post-transformed coordinate, by either a straight line or an n-order function (n is positive integer of 2 or more), and then calculates the pixel change rate at the post-transformed coordinate based on the above approximation function. Here, the n-order function includes an n-order polynomial.

Also, the change rate calculator 22 decides whether or not the pixel of processing target is an inflection point at which the sign of the gradient of the pixel change rate reverses. Here, in order to decide to be the inflection point or not, pixel change rates at 3 pixel coordinates are used, and therefore pixel values at 4 pixel coordinates are used. The above information of the inflection point is used in the processing of the image property analyzer 21 and the pixel value corrector 24. Accordingly, when the above information of the inflection point is used in each processing of the image property analyzer 21 and the pixel value corrector 24, it is preferable for the change rate calculator 22 to have a memory unit, such as a buffer or a shift register, which sequentially retains the pixel change rates of at least 3 pixel coordinates.

Further, the image property analyzer 21 corresponds to an image property analysis unit (image property analysis step) described in the claims. The image property analyzer 21 estimates the property of the image, based on the transition of the pixel change rate of the pixels calculated in the change rate calculator 22. As image property analysis in a narrow range, for example, in regard to an abrupt change of the pixel change rate, a decision is made on the basis of a difference between the pixel change rates of the adjacent 2 pixels among 3 pixels in the vicinity, which are used in the calculation by the change rate calculator 22.

Also, as image property analysis in a relatively wide range, for example, the pixel change rates obtained by the change rate calculator 22 are stored as record for a predetermined number, and the property of the image is analyzed from the pixel change rates in the predetermined range. Namely, the analysis is made on, whether or not the pixel change rate changes through a relatively wide range, whether or not the change of the pixel change rate is abrupt (whether the period of the change is short, that is, whether the image is a high-frequency image) and so on.

Also, in regard to the degree of the change of the pixel change rate, a decision on whether or not the image is a high frequency image may be made by extracting, from among the inflection points decided by the change rate calculator 22, each inflection point having a pixel value greater than, and inclusive of, a predetermined value, and deciding according to the frequency of occurrence (occurrence period) etc. of the extracted inflection point. Alternatively, the above decision may be made by extracting each inflection point having a difference of the pixel change rates, which is a difference from the pixels adjacent to the inflection point pixel and is greater than, and inclusive of, a predetermined value, and deciding according to the frequency of occurrence (occurrence period) etc. of the extracted inflection point. In addition, by the analysis based on the difference of the pixel change rate between the inflection point and the adjacent pixels of the inflection point, a decision may be made on the sharpness of the inflection point, namely, the sharpness at the pixel coordinate.

Further, according to the estimated result of the image property by the image property analyzer 21, the change rate calculator 22 selects a straight line or an n-order function to be used for approximation. Here, preferably, the greater the degree of sharpness is, the higher the order n of the function is set. For example, by use of the image property analysis in a narrow range, for example, straight line (linear function) approximation is used where the change of the pixel change rate (difference of the pixel change rate between the adjacent pixels) is smaller than a first predetermined value. In contrast, a quadratic function is used where the change of the pixel change rate is greater than, and inclusive of, a second predetermined value (>the first predetermined value). Further, a higher order function may be used by setting a third predetermined value (>the second predetermined value).

As such, the analyzed result of the image property in the narrow range may be used in each sequence of processing of the change rate calculator 22, the image property analyzer 21, the prediction pixel value generator 23 and the pixel value corrector 24. However, from the viewpoint of high-speed processing, it is difficult to reflect the entire results of the relatively wide-range image property analysis. The reason is that, while the narrow-range image property analysis is performed by the use of 3 pixels in the vicinity of the post-transformed coordinates, the wide-range image property analysis uses 4 pixels to decide whether the inflection point or not, even in case of analysis using the inflection point.

Therefore, it is preferably to use the result of the relatively wide-range image property analysis not for local processing and decision but for overall processing and decision, such as the adjustment of the thresholds (the first, second, and third predetermined values) for use in the selection of n-order function. For example, the result of the image property analysis relative to a plurality of lines may be applied to change the thresholds for use in the selection of function, according to the frequency of occurrence (occurrence period) of the inflection point having the pixel value greater than, and inclusive of, a predetermined value, or having the degree of sharpness at the coordinates of the inflection point greater than, and inclusive of, a predetermined value.

Also, if the processing of the narrow-range image property analysis is incorporated into each sequence of processing in the change rate calculator 22, the image property analyzer 21, the prediction pixel value generator 23 and the pixel value corrector 24, a processing time to generate one pixel is increased to a certain extent. Therefore, a configuration to omit the aforementioned processing may be considered. In other words, the image property analyzer 21 is configured to analyze the image property of relatively wide range. In this case, for example, a straight line is set as a default, and the change rate calculator 22 selects a function afresh according to the result of the image property analysis for the plurality of lines.

Additionally, there is a high possibility that an original image having a high occurrence frequency of inflection points is a digital image including a character and an illustration, while there is a high possibility that an original image having a low occurrence frequency of inflection points is a natural image including a photo and a picture. Therefore, adjustment may be made in such a manner that, in case of a high occurrence frequency of the inflection points, each threshold is set lower so as to enhance an edge portion more, while in case of a low occurrence frequency of the inflection points, each threshold is set relatively higher. By such the overall adjustment of the thresholds, the sharpness of the enlarged image may be increased more according to the image property.

Now, the prediction pixel value generator 23 corresponds to a pixel value calculation unit (pixel value calculation step) described in the claims. The prediction pixel value generator 23 calculates a pixel value at the post-trans formed coordinate, based on the pixel change rate at the post-transformed coordinate, which is obtained from the change rate calculator 22.

Also, the pixel value corrector 24 corresponds to a pixel value correction unit (pixel value correction step) described in the claims, and corrects the pixel value calculated by the prediction pixel value generator 23. When the post-transformed coordinate is located at a position satisfying a predetermined condition, the pixel value corrector 24 performs correction to a pixel value based on the pixel values of 2 generated pixels adjacent to the post-transformed coordinate. The pixel value corrector 24 then stores the pixel value after the correction (or the pixel value calculated by the prediction pixel value generator 23 when no correction is made) into the output buffer 15.

Here, as correction enforcement conditions (position conditions of the coordinate) on which the pixel value corrector 24 performs pixel value correction, the following mutually independent three conditions are considered, for example: (1) a case that the post-transformed coordinate is located within a predetermined distance from one of the coordinates of the original image; (2) a case that the post-transformed coordinate is located within a predetermined distance from one of the coordinates of the inflection point pixel and pixels adjacent to the inflection point pixel; and (3) a case that the post-transformed coordinate is located within a predetermined distance from a coordinate of the inflection point pixel or a pixel adjacent to the inflection point pixel in the enlargement direction. The details of the above conditions will be described later.

As explained above, according to the image processing apparatus of the present embodiment, there are some options in the functions of the configuration elements. In the following, functional configuration examples will be roughly described. From the viewpoints of apparatus cost and processing speed, which are dependent on a calculation amount (hardware amount), any configuration may be selected according to the application aspect of the image processing apparatus of the present embodiment.

(Configuration 1) The change rate calculator 22 sets a straight line, as an example, as a default for function selection, and does not perform an inflection point decision. Also, the image property analyzer 21 omits image property analysis in a narrow range. Further, in regard to the image property analysis in a relatively wide range, the image property analyzer 21 decides a change period based on differences in the pixel change rates between mutually adjacent pixels. Further, the change rate calculator 22 selects a function afresh according to the result of the image property analysis. Moreover, the pixel value corrector 24 uses the above-mentioned (1) as a correction enforcement condition (position condition of the coordinate).

(Configuration 2) The change rate calculator 22 sets a straight line, as an example, as a default for function selection, and performs an inflection point decision. Also, the image property analyzer 21 omits image property analysis in a narrow range. Further, in regard to the image property analysis in a relatively wide range, the image property analyzer 21 decides a change period based on differences in the pixel change rates between the inflection point pixel and pixels adjacent thereto, and also decides the sharpness of the inflection point. Further, the change rate calculator 22 selects a function afresh according to the result of the image property analysis.

Moreover, the pixel value corrector 24 uses anyone of (1) through (3) as a correction enforcement condition (position condition of the coordinate).

(Configuration 3) The change rate calculator 22 sets a straight line, as an example, as a default for the function selection, and does not perform an inflection point decision. Also, the image property analyzer 21 performs image property analysis in a narrow range (from differences in the pixel change rates between adjacent pixels). Further, in regard to the image property analysis in a relatively wide range, the image property analyzer 21 decides a change period based on differences in the pixel change rates between mutually adjacent pixels. Further, the change rate calculator 22 sequentially selects a function based on a threshold, according to the results of the image property analysis in the narrow range, and also adjusts the threshold according to the results of the image property analysis in the relatively wide range. Moreover, the pixel value corrector 24 uses (1) as a correction enforcement condition (position condition of the coordinates).

(Configuration 4) The change rate calculator 22 sets a straight line, as an example, as a default for function selection, and performs an inflection point decision. Also, the image property analyzer 21 performs image property analysis in a narrow range (from differences in the pixel change rates between adjacent pixels). Further, in regard to the image property analysis in a relatively wide range, the image property analyzer 21 decides a change period based on differences in the pixel change rate between the inflection point pixel and pixels adjacent thereto, and also decides the sharpness of the inflection point. Further, the change rate calculator 22 selects a function sequentially according to the results of the image property analysis in the narrow range, and also adjusts the threshold according to the results of the image property analysis in the relatively wide range. Moreover, the pixel value corrector 24 uses any one of (1) through (3) as a correction enforcement condition (position condition of the coordinate).

Figure 2:
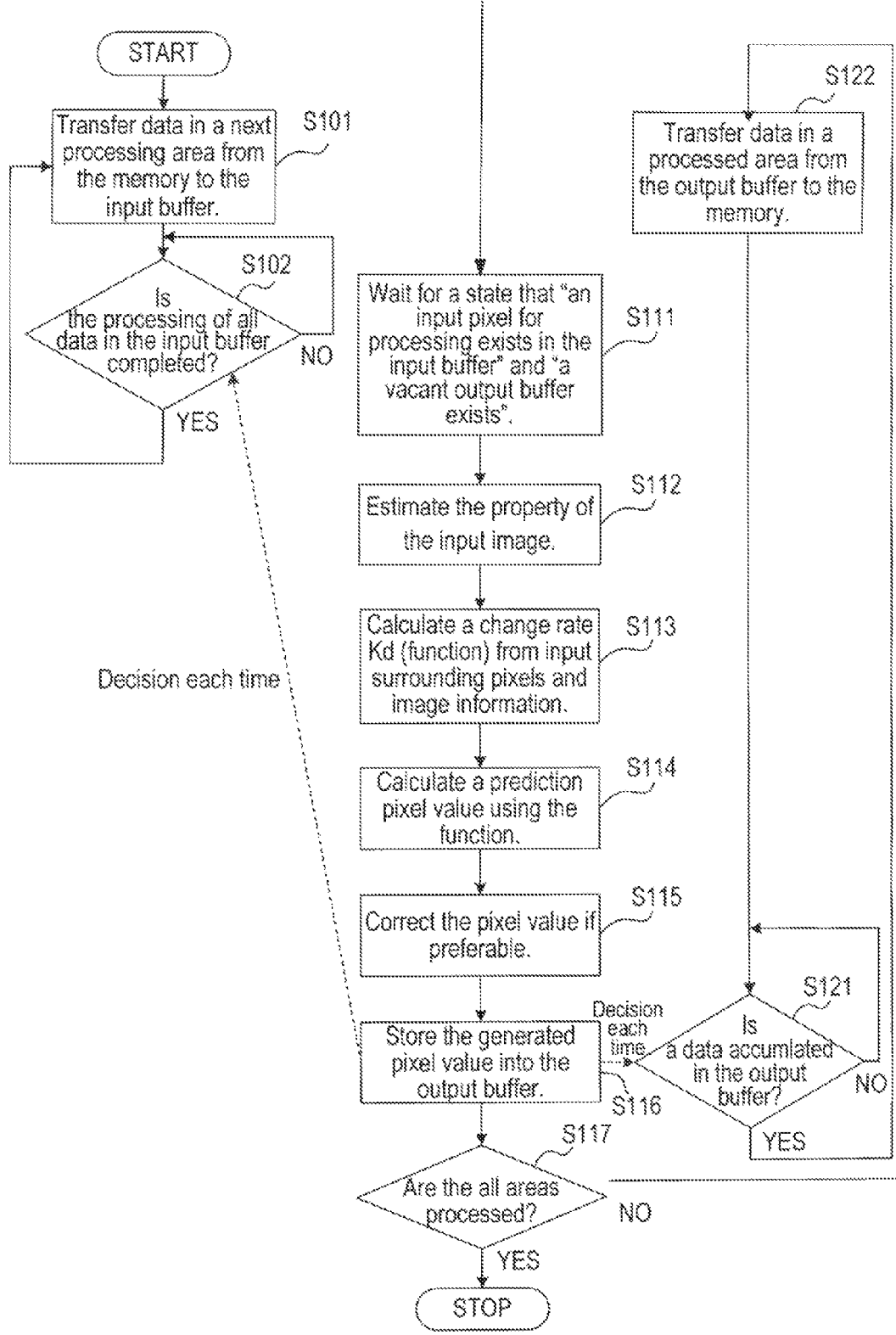
FIG. 2 is a flowchart explaining an image processing method in the image processing apparatus according to the embodiment.
Figure 3:
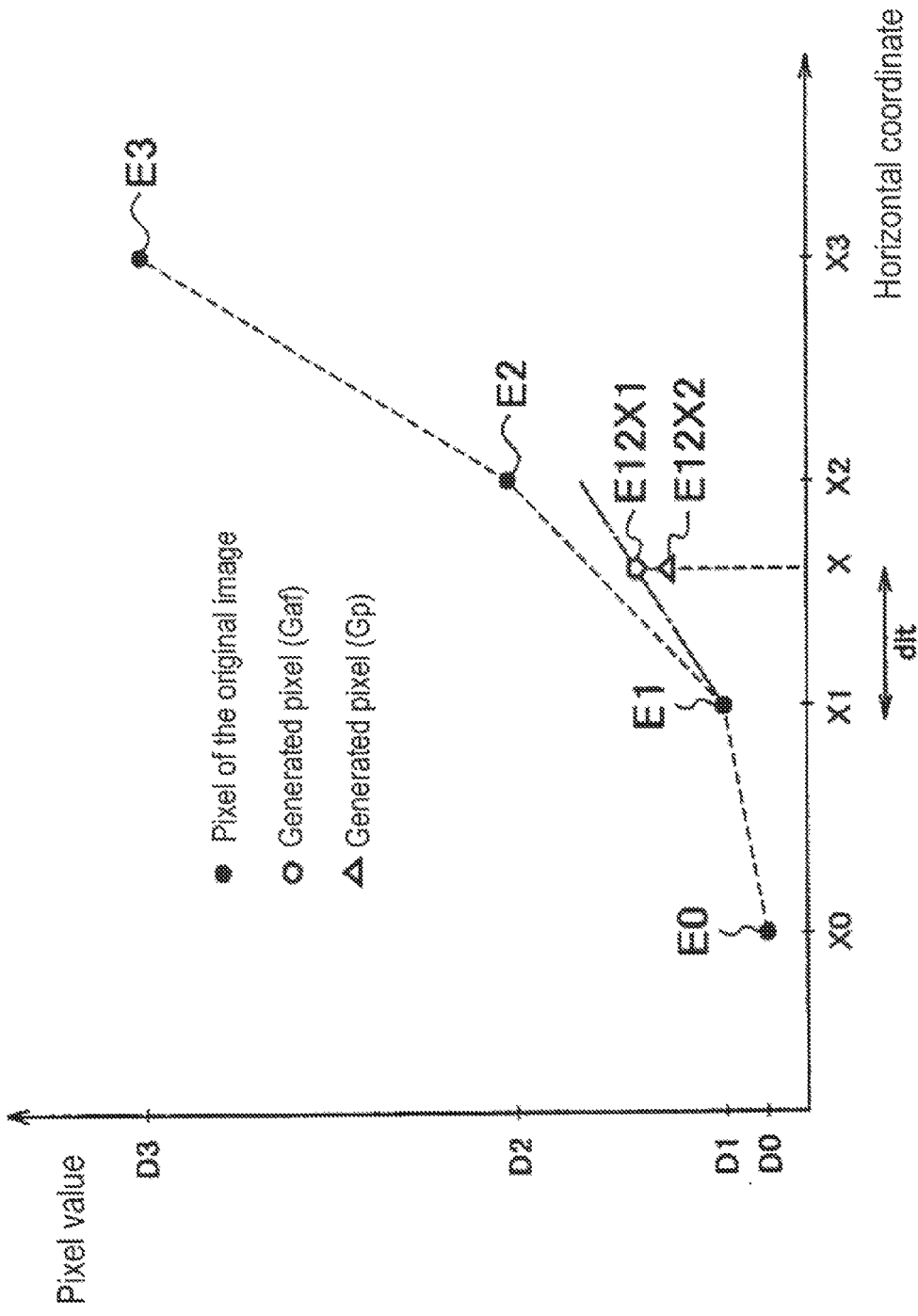
FIG. 3 is an explanation diagram (part 1) schematically explaining the generation of a pixel value according to the embodiment.
Figure 5B:
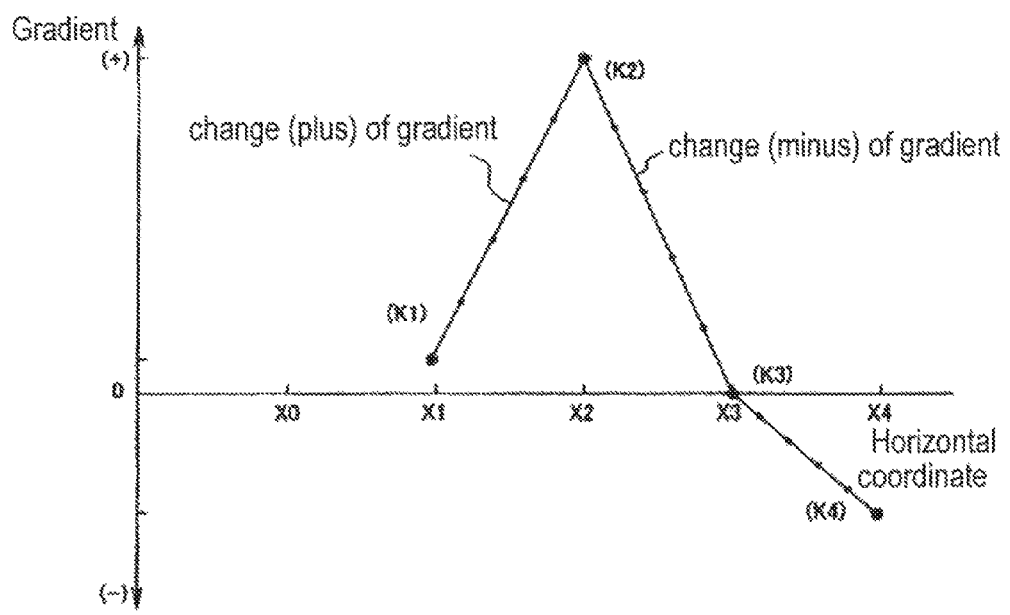
FIG. 5B is an explanation diagram schematically explaining pixel value correction processing performed in a pixel value corrector.

Next, referring to FIGS. 2 through 5A, 5B, an image processing method in the image processing apparatus, having the aforementioned each configuration element according to the present embodiment, will be explained in detail. Here, FIG. 2 is a flowchart explaining the image processing method in the image processing apparatus according to the embodiment; FIGS. 3 and 4 are explanation diagrams schematically explaining the generation of a pixel value according to the embodiment; and FIGS. 5A, 5B are explanation diagrams schematically explaining the correction processing of the pixel value in the pixel value corrector 24.

In the flowchart depicted in FIG. 2, first, by the readout transfer controller 12, the original image data is read out using burst transfer from the data storage area 41 for the original image, which is provided in the memory 40, and the original image data is stored into the input buffer 13 (step S101). In regard to the above data transfer, the overall controller 11 decides whether or not processing related to all of the original image data stored in the input buffer 13 is completed (step S102). Then, the data transfer is carried out at a time point when the processing related to all of the original image data stored in the input buffer 13 is completed. Additionally, in case the input buffer 13 is divided into the first and the second areas, the data transfer is carried out when processing for the pixels stored in either one of the area is completed, and when processing is shifted to processing for the pixels stored in the other area.

Meanwhile, the write transfer controller 14 reads out from the output buffer 15 the image data after enlargement processing, and stores the readout data into the data storage area 42 for enlarged image, provided in the memory 40, using burst transfer (step S122). In regard to the above data transfer, each time the data is generated, the overall controller 11 decides whether or not pixel values (image data after enlargement processing) stored in the output buffer 15 reach the capacity of the output buffer 15. Then, the data transfer is carried out at a time point when the image data amount reaches the capacity of the output buffer 15. Additionally, in case the output buffer 15 is divided into the first and the second areas, the data transfer is carried out when storage into either one of the area is completed, and when processing is shifted to storage processing into the other area.

Next, the series of processing in each configuration element, including the image property analyzer 21, the change rate calculator 22, the prediction pixel value generator 23, and the pixel value corrector 24, is started after waiting for the occurrence of such a state that an input pixel used for processing is stored in the input buffer 13, and the output buffer 15 comes to have a vacant area (step S111). In the following, an explanation will be given on the assumption that the transformation processing of the pixel coordinate of the enlarged image into the coordinate of the original image has been carried out in advance, or is carried out sequentially, in the overall controller 11. Also, the notification of the post-transformed coordinate of the enlarged image in the original image is to be made to the above each configuration element.

First, the image property analyzer 21 estimates the image property, based on the transition of the pixel change rate of the pixels calculated in the change rate calculator 22 (step S112).

Next, in regard to the post-transformed coordinate indicated from the overall controller 11, the change rate calculator 22 reads out the pixel values of 3 pixels in the vicinity, including the adjacent 2 pixels, of the post-transformed coordinate. Then, based on the pixel values of the above 3 pixels, the change rate calculator 22 obtains the pixel change rates of the adjacent 2 pixels, and next, estimates the pixel change rate at the post-transformed coordinate, based on the pixel change rates of the adjacent 2 pixels (step S113).

Additionally, in the narrow-range image property analysis, on the basis of the pixel change rates of the adjacent 2 pixels obtained in the change rate calculator 22, the image property analyzer 21 obtains the difference between them, and analyzes the change of the pixel change rates. Based on the above analysis result, the change rate calculator 22 selects a straight line or an n-order function to be used for approximation by comparing with a predetermined threshold, and obtains a pixel change rate at the post-transformed coordinate.

Also, the image property analysis in the relatively wide range is carried out after a predetermined number of the pixel change rates obtained by the change rate calculator 22 are accumulated. In case the change rate calculator 22 is configured to perform an inflection point decision, a change period is decided based on differences in the pixel change rates between each inflection point pixel and pixels adjacent thereto, and also the sharpness at the inflection point is decided. In case the change rate calculator 22 is configured not to perform the inflection point decision, a change period is decided based on differences in the pixel change rates between mutually adjacent pixels. Based on the above analysis result, the change rate calculator 22 adjusts a predetermined threshold to be used for function selection.

Next, based on the pixel change rate at the post-transformed coordinate obtained in the change rate calculator 22, the prediction pixel value generator 23 calculates the pixel value at the post-transformed coordinate (step S114).

Now, referring to FIGS. 3 and 4, a processing in the change rate calculator 22 and the prediction pixel value generator 23 will be explained below. Here, it is assumed that, in the original image, pixels E0, E1, E2, and E3 having pixel values D0, D1, D2, and D3 exist at horizontal coordinates X0, X1, X2, and X3, respectively, on a certain line in the horizontal direction. Also, a post-transformed coordinate X is assumed, which is obtained through transformation from the pixel coordinate of the enlarged image into the coordinate value of the original image. It is also assumed that a pixel generated by the enlargement processing exists at the horizontal coordinate X.

At the calculation of the pixel value at the post-transformed coordinate X, the adjacent 2 pixels are E1 and E2, and the 3 pixels in the vicinity are E0, E1, and E2. First, the change rate calculator 22 obtains the pixel change rates of the adjacent 2 pixels E1, E2. As depicted in FIG. 4, the pixel change rate of the pixel E1 is obtained as a gradient K1=E1−E0, and the pixel change rate of the pixel E2 is obtained as a gradient K2=E2−E1.

Next, in case of approximating the transition of pixel change rate between 2 pixels in the vicinity of the post-transformed coordinate using a straight line (linear function), as depicted in FIG. 4, the approximated transition is a line transition having a forward gradient Gaf, which is connecting the pixel change rates of the 2 pixels with a straight-line. On the assumption of X2−X1=1, a pixel change rate Kd1 at the post-transformed coordinate X based on the linear function is obtained from the following equation, where dlt is a distance from the coordinate X1 of the pixel E1 to the post-transformed coordinate X.

$$Kd1 = K1 \times (1-dlt) + (K2 \times dlt) \quad (1)$$

Also, in case of approximating the transition of the pixel change rates of the 2 pixels in the vicinity of the post-transformed coordinate using a quadratic function $k=f(x^2)$, the transition is a transition according to a dotted line in FIG. 4 obtained by connecting the pixel change rates of the 2 pixels by the quadratic function. A pixel change rate Kd2 at the post-transformed coordinate X, which is based on the quadratic function, is obtained from the following equation.

$$Kd2 = K1 + \{f(x^2):x=dlt\} \quad (2)$$

Then, using the pixel change rate Kd1 based on the linear function or the pixel change rate Kd2 based on the quadratic function, the prediction pixel value generator 23 obtains pixel values D12X1, D12X2 at the post-transformed coordinate X, respectively from the following equation.

$$D12X1 = D1 + Kd1 \times dlt \quad (3)$$

$$D12X2 = D1 + Kd2 \times dlt \quad (4)$$

Namely, by the linear approximation of the pixel change rate, a pixel E12X1 having a pixel value D12X1 is generated, while by the approximation of the pixel change rate using the quadratic function, a pixel E12X2 having a pixel value D12X2 is generated, respectively, as the pixels of the enlarged image.

In the aforementioned explanation, the pixel change rate is obtained as a pixel value difference between a pixel of interest and a forward pixel adjacent to the pixel (forward gradient Gaf). However, as depicted in FIG. 4, the pixel change rate may be obtained as a pixel value difference between a pixel of interest and a backward pixel adjacent to the pixel (backward gradient Gab). In the latter case, the approximation on the transition of the pixel change rate is made in a shifted manner (to a section between the horizontal coordinates X0 and X1 in the above example). Therefore, for easy understanding, the approximation using the forward gradient Gaf is preferable.

Next, in the flowchart depicted in FIG. 2, the pixel value corrector 24 corrects the pixel value calculated in the prediction pixel value generator 23 in case that a correction is preferable (step S115). Here, when the post-transformed coordinate is located within a predetermined distance from the inflection point pixel or a pixel adjacent to the inflection point pixel in the enlargement direction [position condition (3)], the pixel value corrector 24 performs correction to a pixel value based on the pixel values of two generated pixels adjacent to the post-transformed coordinate.

The above correction processing in the pixel value corrector 24 will be explained in detail by reference to FIGS. 5A, 5B. Here, it is assumed that, in the original image, pixels E0, E1, E2, E3, and E4 having pixel values D0, D1, D2, D3, and D4 exist at horizontal coordinates X0, X1, X2, X3, and X4, respectively, on a certain line in the horizontal direction, as depicted in FIG. 5A. Also, the present example is based on the processing of 5 times enlargement, and accordingly, as the post-transformed coordinate of the enlarged image in the original image, 4 coordinates exist between each of adjacent pixels of the original.

Similar to the preceding example, in case of approximating the transition of pixel change rate (forward gradient) between 2 pixels in the vicinity of the post-transformed coordinate (the 2 pixels adjacent to the post-transformed coordinate) using a straight line (linear function), the approximated transition is a line transition connecting the pixel change rates of 2 pixels with a straight line. Here, the sign of a gradient of the pixel change rate is reversed from plus to minus before and after the horizontal coordinate X2, and accordingly, the change rate calculator 22 decides that the horizontal coordinate X2 (pixel E2) is an inflection point. "Gradient" in FIG. 5B correspond to the pixel change rate.

Further, similar to the preceding example (FIGS. 3 and 4), a pixel change rate at the post-transformed coordinate is obtained based on a linear function [refer to equation (1)]. Then, by obtaining a pixel value at the post-transformed coordinate [refer to equation (3)], the pixel value of each pixel in the enlarged image is obtained, as depicted in FIG. 5A (as represented in the figure with an outlined circle: ○). However, the transition around the pixel E2 at the inflection point and the pixel E3 adjacent to the inflection point pixel E2 in the enlargement direction are, as apparent from FIG. 5A, unnatural (not smooth) as the transition of the pixel values of the enlarged image.

It is considered that the above problem is caused by that approximation of the pixel change rate transition between 2 pixels in the vicinity of the post-transformed coordinate (the adjacent 2 pixels) using a straight line (linear function) has the same meaning as performing the first-order differentiation of a function that expresses a gradient between 2 pixels relative to pixel value transition. Namely, in case of the differentiation on a pixel-by-pixel basis, the pixel coordinates of the original image produce a differential boundary, which particularly produces an unnatural state in the vicinity of the inflection point. Additionally, the approximation by an n-order function has the same meaning as n-order differentiation, and as the number n increases, it is considered the unnatural state markedly increases.

Accordingly, when the post-transformed coordinate is located within a predetermined distance from a coordinate of the inflection point pixel or a pixel adjacent to the inflection point pixel in the enlargement direction [position condition (3)], the pixel value corrector 24 corrects the obtained pixel value at the post-transformed coordinate based on the pixel values of the generated two pixels adjacent to the post-transformed coordinate. Here, in regard to the "predetermined distance from the coordinate", it is preferable to perform correction processing for a range of ±0.05 through ±0.1 as an example, on the assumption that the distance of adjacent pixels of the original image data is 1. The above correction processing makes a calculation amount increase to some degree. However, the influence on the calculation amount may be suppressed because the existence of the post-transformed coordinate within the above predetermined range has a small probability.

In FIG. 5A, with regard to the pixel E2 at the inflection point, a correction into a pixel E2a is made through a linear correction using a pixel E12-8 and a pixel E23-2. With regard to the pixel E3 adjacent, in the enlargement direction, to the pixel E2 at the inflection point, similarly, a correction into a pixel E3a is made through a linear correction using a pixel E23-8 and a pixel E34-2.

As such, in the correction processing, the pixel value corrector 24 uses the pixel value of the pixel, which is generated as the pixel of the enlarged image and located at a farther position than the coordinate of the corrected point in the enlargement (forward) direction. Therefore, a memory unit such as a buffer or a shift register is preferably provided to retain at least three 3 pixel values. Here, without the provision of the memory unit in the pixel value corrector 24, the pixel value once stored in the output buffer 15 may be referred, and the pixel at the correction point may be rewritten to a corrected value after correction processing.

In the above explanation, as a position condition to perform pixel value correction, the above position condition (3) has been used. In contrast, in the case of the position condition (1) and the position condition (2), the number of points for pixel value correction is greater than in the case of the position condition (3), and therefore, the processing time becomes increased. Accordingly, as in the present example, it is preferable to use the position condition (3) as the position condition for pixel value correction. However, when the decision of an inflection point is not performed from the viewpoint of suppressing the overall calculation amount, the position condition (1) may be applied.

Preferably, the pixel value correction by the pixel value corrector 24 is to be carried out when the enlargement ratio is higher than 2 or 3, while not to be carried out when the enlargement ratio is lower than 2 or 3. The reason is that the purpose of the correction is to remove the unnatural state in the vicinity of the inflection point by linear correction using adjacent 2 pixels. In the case of a relatively low enlargement ratio, the distance between 2 generated pixels is large, and the linear correction may produce unnatural pixel values, contrary to the intention.

Now, in the flowchart depicted in FIG. 2, a pixel value after correction processing by the pixel value corrector 24 (in case of no correction, a pixel value calculated in the prediction pixel value generator 23) is stored into the output buffer 15 (step S116). At this time, the overall controller 11 decides each time whether or not the processing for all of the original image data stored in the input buffer 13 is completed, and whether the pixel values (image data after enlargement processing) stored in the output buffer 15 reach the capacity of the output buffer 15.

Then, the overall controller 11 decides whether or not the processing is completed for all of the pixels to be generated in the enlargement processing (step S117). If the entire processing for the pixels to be generated is completed, the overall controller 11 completes a series of processing. If the entire processing is not completed, the processing is returned to step S111 and repeated.

APPLICATION EXAMPLE 1

Next, in order to compare the image enlargement processing method according to the present embodiment with the general methods (the nearest neighbor method and the bilinear method), the results of simulation experiments are explained below as application examples. In the following application examples 1 and 2, the aforementioned [configuration example 2] is used. Namely, by setting a straight line as a default, the change rate calculator 22 decides an inflection point. Also, the image property analyzer 21 omits the image property analysis of a narrow range. Further, the image property analysis of a relatively wide range is not carried out because the original image data to be processed is a few. Further, the pixel value corrector 24 uses the aforementioned (1), as a correction enforcement condition (position condition of the coordinate).

Figure 8A:
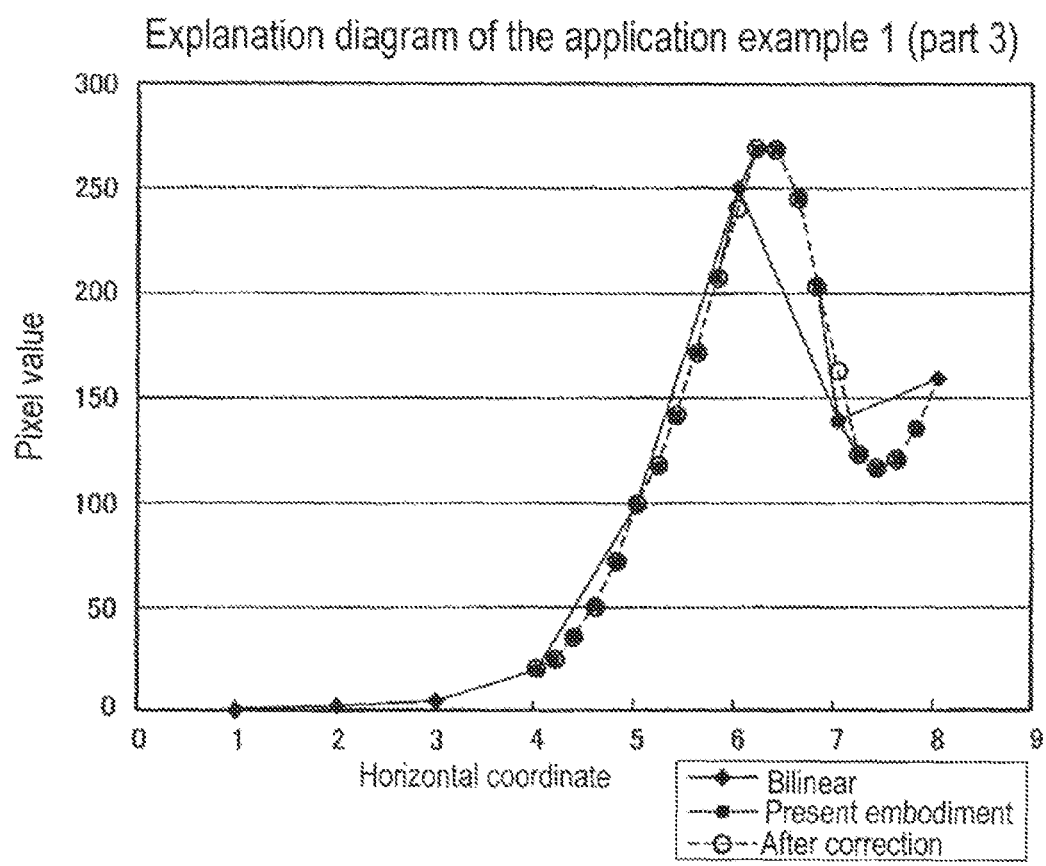
FIG. 8A is an explanation diagram (part 3) contrasting a pixel value transition in the image enlargement processing method according to the embodiment with a general method.
Figure 8B:
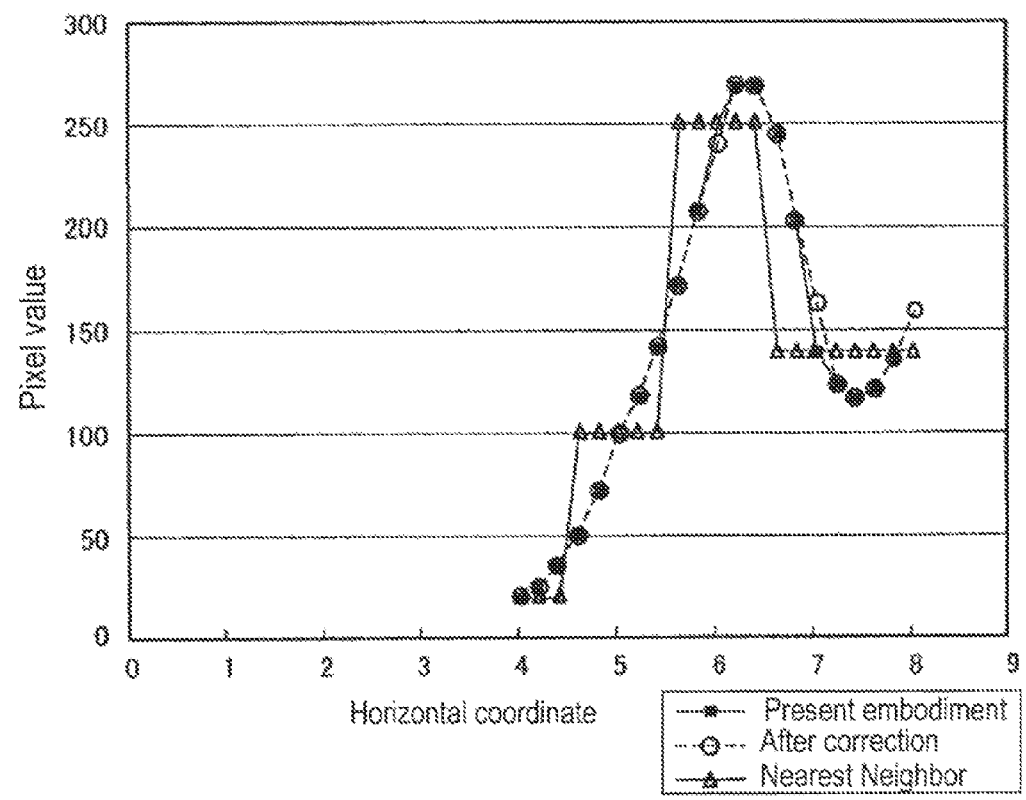
FIGS. 8B is an explanation diagram (part 4) contrasting a pixel value transition in the image enlargement processing method according to the embodiment with another general method.

First, in regard to the application example 1, an explanation will be given by reference to the explanation diagrams depicted in FIGS. 6 through 8A, 8B. Here, FIG. 6 is an explanation diagram exemplifying the image data of the original image, and FIG. 7 is an explanation diagram exemplifying a calculation process of pixel values and a resultant numeric value table. Further, FIG. 8A, 8B are explanation diagrams in which the transition of the pixel value according to the image enlargement processing method of the present embodiment is compared with the transition according to each general method. Here, the application example 1 is a case of 5 times enlargement of the original image data, and an simulation result between the horizontal coordinates 4 and 8 is explained. Here, "Gradients" in FIG. 7 correspond to the pixel change rate.

As an application of the present embodiment, for the image data of the original image depicted in FIG. 6, the transition of the pixel change rate (forward gradient) between 2 pixels adjacent to the post-transformed coordinate is approximated using a straight line (linear function). Similar to the example used in the above explanation, the pixel change rate has been obtained at each post-transformed coordinate based on the linear function [refer to equation (1)], which is depicted as each "predicted gradient Kd" in FIG. 7. Further, by use of the above predicted gradient Kd, the pixel value at each post-transformed coordinate has been obtained [refer to equation (3)], which is depicted as each "predicted pixel value" in FIG. 7.

Also, in the original image data of the application example 1, an inflection point pixel exists at the horizontal coordinate 6. In the application example 1, as a condition to perform correction processing in the pixel value corrector 24, the correction enforcement condition (1): "in case that the post-transformed coordinate is located within a predetermined distance from the pixel coordinate of the original image" is used.

Here, a pixel which does not correspond to the correction enforcement condition (3) but corresponds to the correction enforcement condition (2) is a pixel at a horizontal coordinate 5. However, the correction amount is small as compared with the correction amount for other correction targets (horizontal coordinates 6 and 7). By this, even under the correction enforcement condition (1): "in case that the post-transformed coordinate is located within a predetermined distance from the pixel coordinate of the original image", it could actually be proved that an influence on the image quality is small.

Further, each pixel value generated by the nearest neighbor method is depicted in FIG. 7 (in this figure, numerals in the parentheses indicates pixel coordinates selected in the nearest neighbor method), and the transition of the generated pixel value is depicted in FIG. 8B by superposition. Also, the transition of the pixel value generated by the bilinear method is depicted in FIG. 8A by superposition. In comparison with such the general methods of conventional image enlargement processing, the transition of the generated pixel values before the correction and after the correction by the image enlargement processing according to the present invention is smooth. Accordingly, it is easily understood that the problem of image quality (jaggy, blur, etc.) in the conventional methods may be reduced.

APPLICATION EXAMPLE 2

Figure 11A:
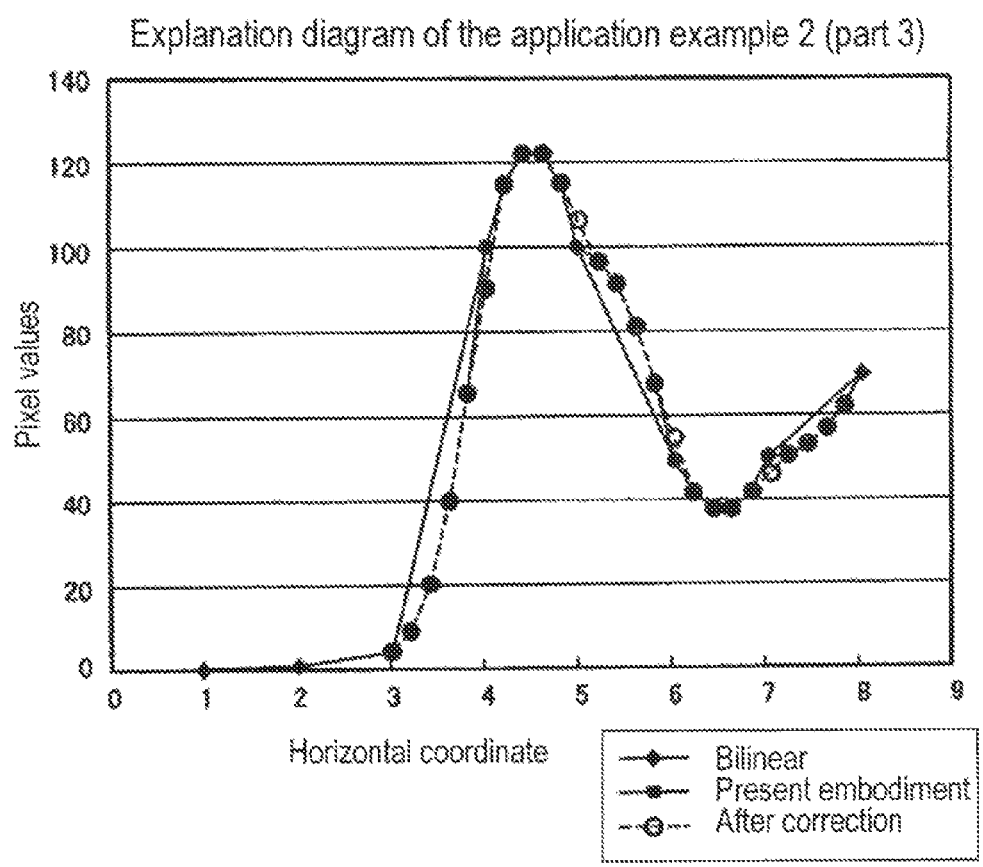
FIG. 11A is an explanation diagram (part 3) contrasting a pixel value transition in the image enlargement processing method according to the embodiment with a general method.
Figure 11B:
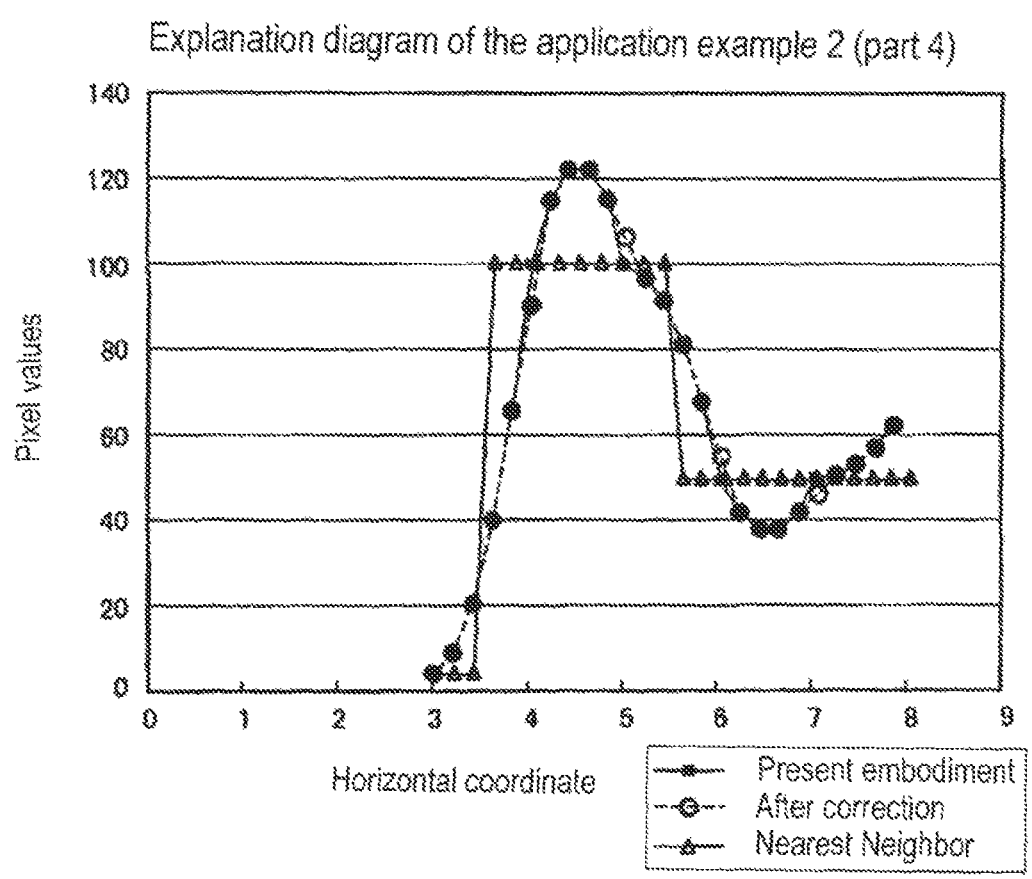
FIG. 11B is an explanation diagram (part 4) contrasting a pixel value transition in the image enlargement processing method according to the embodiment with another general method.

Next, in regard to the application example 2, an explanation will be given by reference to the explanation diagrams depicted in FIGS. 9 through 11A, 11B. Here, FIG. 9 is an explanation diagram exemplifying the image data of the original image, FIG. 10 is an explanation diagram exemplifying a pixel value calculation process and a resultant numeric value table, and FIG. 11A, 11B are explanation diagrams in which the transition of pixel values according to the image enlargement processing method of the present embodiment is compared with the transition according to the general methods. Here, the application example 2 is a case of 5 times enlargement of the original image data, and a simulation result between the horizontal coordinates 3 and 8 is explained. Here, "Gradients" in FIG. 10 correspond to the pixel change rate.

As an application of the present embodiment, for the image data of the original image depicted in FIG. 9, the transition of the pixel change rate (forward gradient) between adjacent 2 pixels of each post-transformed coordinate is approximated using a straight line (linear function). Similar to the example used in the above explanation, the pixel change rate based on the linear function at each post-transformed coordinate has been obtained [refer to equation (1)], which is depicted as each "predicted gradient Kd" in FIG. 10. Further, by use of the above predicted gradient Kd, the pixel value at each post-transformed coordinate has been obtained [refer to equation (3)], which is depicted as each "predicted pixel value" in FIG. 10.

In the application example 2, as a condition to perform correction processing in the pixel value corrector 24, the correction enforcement condition (1): "in case that the post-transformed coordinate is located within a predetermined distance from the pixel coordinate of the original image" is used.

Further, each pixel value generated by the nearest neighbor method is depicted in FIG. 10 (in this figure, numerals in the parentheses indicates pixel coordinates selected in the nearest neighbor method), and the transition of the generated pixel value is depicted in FIG. 11B by superposition. Also, the transition of the pixel value generated by the bilinear method is depicted in FIG. 11A by superposition. In comparison with such the general methods of conventional image enlargement processing, the transition of the generated pixel value before the correction and after the correction by the image enlargement processing according to the present embodiment is smooth. Accordingly, it is easily understood that the problem of image quality (jaggy, blur, etc.) in the conventional methods may be reduced.

Further, the application examples 1 and 2 exemplify edge parts in the original image data. As depicted in FIGS. 8A, 8B and 11A, 11B, according to the image enlargement processing method of the present embodiment, the pixel values of the enlarged image are generated to have slight overshoots in the convex parts of the transition of the pixel value, while slight undershoots in the concave parts. Accordingly, the sharpness in each edge part is enhanced. As a result, it may be easily understood that the problem of image quality (jaggy, blur, etc.) is eliminated.

As having been explained, the processing apparatus and the image processing method for generating an enlarged image that is enlarged in one direction based on the original image are provided in the present embodiment. After the overall controller 11 transforms the pixel coordinates of the enlarged image into coordinates of the original image, the change rate calculator 22 (change rate calculation step) obtains the pixel change rates of the adjacent 2 pixels, based on the pixel values of the 3 pixels in the vicinity, including the adjacent 2 pixels, of the post-trans formed coordinate in the original image, and then estimates the pixel change rate at the post-transformed coordinate, based on the pixel change rates of the adjacent 2 pixels. The prediction pixel value generator 23 (pixel value calculation step) calculates the pixel value at the post-transformed coordinate based on the pixel change rate at the post-transformed coordinate.

By this, the image processing apparatus and the image processing method obtaining an enlarged image of better image quality may be achieved with a suppressed calculation amount.

First, the calculation amount is compared and examined. The conventional nearest neighbor method and the bilinear method are methods based on the pixel values of the adjacent 2 pixels, while the bicubic method is a method based on 4 pixels in the vicinity, including the adjacent 2 pixels. In contrast, the image processing apparatus and the image processing method according to the present embodiment is a method based on the pixel values of 3 pixels in the vicinity, including the adjacent 2 pixels.

Accordingly, by a rough comparison of the calculation amount of the enlargement processing in one direction, the ratio of calculation amounts of "the nearest neighbor method: the bilinear method:the bicubic method:the method of the present embodiment" becomes "1:2:4:3". Here, the nearest neighbor method is considered as "1" because it employs a simple replacement of pixel values. In other words, the method according to the present embodiment has a larger calculation amount than the nearest neighbor method and the bilinear method in which the calculation amount is small, though image quality is degraded. However, it may be said that the present embodiment has a smaller calculation amount than the bicubic method in which the calculation amount is large, though good image quality is obtained.

Next, with regard to the image quality, there is a tendency that generally the image quality becomes better in proportion to the calculation amount. By the method according to the present embodiment, better image quality may be obtained as compared with the nearest neighbor method and the bilinear method, while the image quality is inferior to the bicubic method to a certain degree. In fact, as depicted in the application examples 1 and 2, in comparison with the nearest neighbor method and the bilinear method, the transition of the pixel values before the correction and after the correction according to the present embodiment is smooth. It has been proved actually that the problem of image quality (jaggy, blur, etc.) may be reduced.

Further, according to the present embodiment, the change rate calculator 22 (change rate calculation step) is configured to estimate the pixel change rate at the post-transformed coordinate, by approximating the transition of the pixel change rate between the adjacent 2 pixels, using a straight line or an n-order function (n is a positive integer of 2 or more).

As is apparent by reference to FIGS. 8A, in comparison with simple linear approximation (bilinear method) of pixel values between adjacent pixels, the present embodiment functions to make a portion, where pixel values change more conspicuous, even when the straight line is used. Further, the higher the order of the function is set, the greater the degree of conspicuousness becomes. Also, as explained in the application examples 1 and 2, the pixel values of the enlarged image are generated to have slight overshoots in the convex parts of the transition of the pixel values, and slight undershoots in the concave parts.

In other words, according to the image processing apparatus and the image processing method of the present embodiment, when the pixels of the enlarged image are generated, the degree of change in the pixel values in the convex and concave parts of the transition of the pixel values is enhanced more in both upward and downward directions. Thus, the sharpness in the edge portions of the original image is enhanced more. As a result, the problem of image quality (jaggy, blur, etc.) is eliminated. Also, the edges are enhanced by the processing independent of the edge enhancement processing, and accordingly, there is no such a conventional problem that edge enhancement processing is damaged by enlargement processing after the edge enhancement processing.

Further, according to the present embodiment, the image property analyzer 21 (image property analysis step) is configured to estimate the image property based on the transition of the pixel change rates of the pixels, so as to select a straight line or an n-order function to be used for approximation according to the result of the image property analysis.

For example, analysis is made on whether the pixel change rate is changed abruptly, whether the pixel change rate is greatly changed in a relatively wide range, and whether the change of the pixel change rate is intense (the change period is short), and according to the analysis result, the function is selected. As such, because the edge portions of the enlarged image are enhanced according to the image property, the sharpness may be increased to a greater extent.

Further, according to the present embodiment, when the post-transformed coordinate is located within a predetermined distance from the pixel coordinate of the original image, the pixel value corrector 24 (pixel value correction step) is configured to correct the pixel value, based on the pixel values of two generated pixels adjacent to the post-transformed coordinate.

The method of the present embodiment is equivalent to performing differentiation at each interval of the pixels at the time of the pixel generation of the enlarged image, in which the pixel coordinates of the original image become the differentiation boundary thereof. Here, because of the correction of the generated pixel in the vicinity of the pixel coordinates of the original image, the transition of the generated pixel value may be made smoother, and the image quality of the enlarged image may be improved accordingly. Although the calculation amount is increased to a certain extent by the correction processing, an influence to the calculation amount may be suppressed, because the probability of the existence of the post-transformed coordinate in the vicinity of the pixel coordinate in the original image is low.

Further, according to the present embodiment, when the post-transformed coordinate is located within a predetermined distance from a coordinate of the inflection point pixel or the pixel adjacent to the inflection point pixel in the enlargement direction, the pixel value corrector 24 (pixel value correction step) is configured to performs correction to a pixel value, based on the pixel values of 2 generated pixels adjacent to the post-transformed coordinate. Here, the inflection point pixel is a pixel located at an inflection point at which the sign of the gradient of the pixel change rate changes, and is decided by the change rate calculator 22 (change rate calculation step).

As such, after the decision of whether or not an inflection point exists, the generated pixels in the vicinity of pixels of the original image, which are near to the inflection point pixel or a pixel adjacent to the inflection point pixel in the enlargement direction, are determined to be a correction target. Accordingly, the transition of the generated pixel values may be made smoother, and also an influence to the calculation amount may be suppressed to a greater extent.

DEFORMATION EXAMPLE 1

In the embodiment described above, according to the image property analysis result by the image property analyzer 21 based on the transition of the pixel change rate, the straight line or the n-order function to be used for approximation is selected. However, when the transition of the pixel change rate is flatter, an enlarged image may be generated by the nearest neighbor method or the bilinear method.

For example, the image processing circuit 10 depicted in FIG. 1 may be configured to have a second pixel value calculation unit for calculating a pixel value at the post-transformed coordinate by the nearest neighbor method, and a third pixel value calculation unit for calculating a pixel value at the post-transformed coordinate by the bilinear method. According to the image property analysis result in the image property analyzer 21, the overall controller 11 selects either one of the pixel value calculation unit (prediction pixel value generator 23), the second pixel value calculation unit, and the third pixel value calculation unit, so as to calculate the pixel value at the post-transformed coordinate. Further, the change rate calculator 22 may be provided with the second pixel value calculation unit and the third pixel value calculation unit as function options.

For example, in case there is no abrupt change of the pixel change rate, no great change of the pixel change rate in a relatively wide range, or a small change of the pixel change rate (the change period is longer than a predetermined value), the pixel of the enlarged image is generated by the nearest neighbor method or the bilinear method, instead of the method according to the present embodiment. Additionally, according to the degree of flatness (the length of the change period or the like) in the transition of the pixel change rate, it is preferable to satisfy "the predetermined value to select the nearest neighbor method>the predetermined value to select the bilinear method".

Figure 12A:
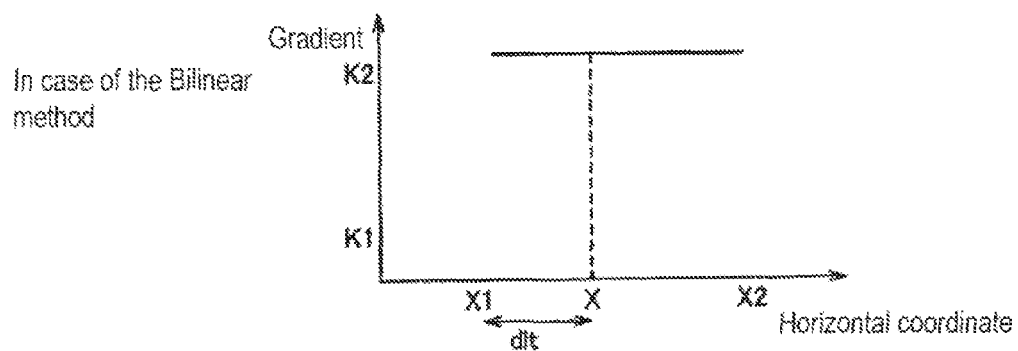
FIG. 12A-12D are explanation diagrams explaining the changeover of a change rate calculation method in the deformation example 1.
Figure 12B:
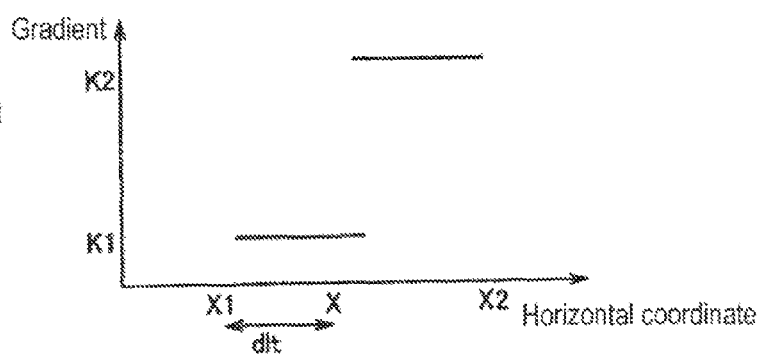
Figure 12C:
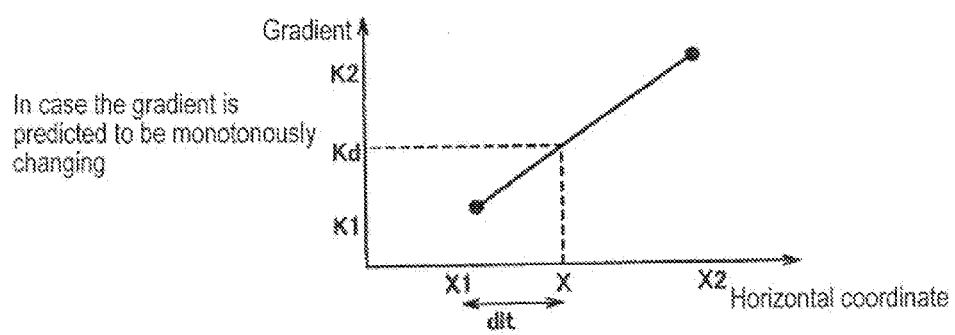
Figure 12D:
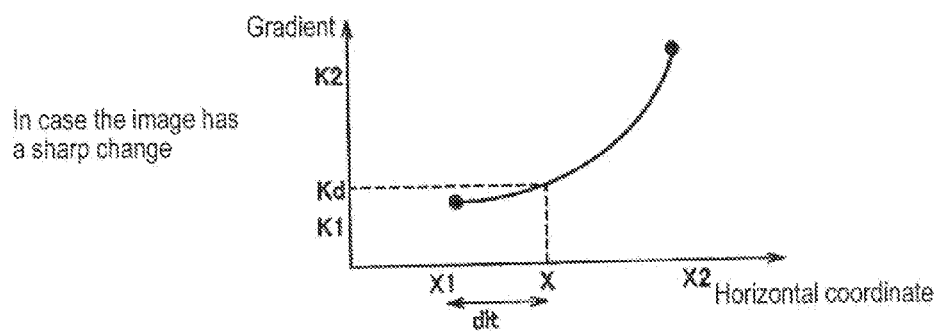

Referring to FIGS. 12A through 12D, a description will be given to the changeover of the change rate calculation method. With regard to a function to approximate the pixel change rate, FIG. 12A is a case according to the bilinear method, FIG. 12*b* is a case according to the nearest neighbor method, FIG. 12C is a case according to the aforementioned embodiment (linear approximation), and FIG. 12D is a case according to the embodiment (polynomial approximation), respectively.

First, in the case of the bilinear method, straight-line interpolation is performed for the pixel values between 2 pixels adjacent to the post-transformed coordinate. Accordingly, as depicted in FIG. 12A, the pixel change rate between adjacent 2 pixels is approximated using the constant value of the pixel change rate at a posterior pixel (X2). The bilinear method has less calculation amount than the method explained in the embodiment. Therefore, it is preferable to apply the bilinear method when the transition of the pixel change rate is gentler or flatter, as the property of the original image.

In the case of the nearest neighbor method, the pixel value of a nearest pixel is used as the pixel value of the post-transformed coordinate, and therefore, the pixel change rate between the adjacent 2 pixels is that depicted in FIG. 12B. Namely, let "dlt" be a distance from the coordinate X1 of a prior pixel to the post-transformed coordinate X, then, in the range of dlt=0 to 0.5, approximation is made using the constant value of the pixel change rate of the prior pixel, while in the range of dlt=0.5 to 1, approximation is made using the constant value of the pixel change rate of the posterior pixel. The nearest neighbor method has less calculation amount than the bilinear method. Therefore, it is preferable to apply the nearest neighbor method when the transition of the pixel change rate is further slower or flatter, as the property of the original image.

Next, in the case of the embodiment (straight-line approximation), as depicted in FIG. 12C, the transition of the pixel change rate between 2 pixels adjacent to the post-transformed coordinate is approximated by a straight line. Preferably, the straight-line approximation according to the embodiment is applied when there is an abrupt change of the pixel change rate, and the pixel change rate greatly changes in a relatively wide range, or the change of the pixel change rate is intense (the change period is short). The straight line approximation according to the embodiment has a larger calculation amount than the nearest neighbor method or the bilinear method. However, in the enlargement processing of the original image having such the property, the problem of image quality (jaggy, blur, etc.) caused by the nearest neighbor method or the bilinear method may be reduced.

Further, in the case of the embodiment (polynomial approximation), as depicted in FIG. 12D, the transition of the pixel change rate between 2 pixels adjacent to the post-transformed coordinate is approximated using a polynomial. Preferably, the polynomial approximation according to the embodiment is applied when there is a more abrupt change of the pixel change rate than in the case when the straight line approximation is applied, and the pixel change rate greatly changes in a relatively wide range, or the change of the pixel change rate is intense (the change period is short). The polynomial approximation according to the embodiment has still larger calculation amount, and however, in the enlargement processing of the original image having such the property, the problem of image quality (jaggy, blur, etc.) may be reduced further.

As such, in the deformation example 1, according to the image property analysis result in the image property analyzer 21, a pixel value at the post-transformed coordinate is calculated by the selection of one of the pixel value calculation unit (prediction pixel value generator 23), the second pixel value calculation unit, and the third pixel value calculation unit. By this, a high processing speed may be achieved while maintaining the image quality of the enlarged image.

Namely, when the transition of the pixel change rate is flatter, the pixels of the enlarged image are generated after changeover to a method having a smaller calculation amount. Thus, high speed processing may be achieved. In addition, a predetermined value to select either the nearest neighbor method or the bilinear method is determined through a tradeoff between the processing speed and the deterioration of the image quality in the enlarged image. It is preferable to obtain the predetermined value experimentally.

DEFORMATION EXAMPLE 2

In the embodiment and the deformation example 1 described above, the image property of the original image is analyzed in the image property analyzer 21, then the approximation function for the pixel change rate is selected, and the changeover to the nearest neighbor method or the bilinear method is performed. However, the above selection and changeover may be performed through user setting.

Namely, a user interface is configured to include the selection setting of "natural pictures" or "documents or illustrations", for example. In case the "natural pictures" is selected, approximation by the higher order function or the polynomial approximation of the embodiment is applied, while in case the "documents and illustrations" is selected, the straight-line approximation of the present embodiment, the nearest neighbor method, or the bilinear method is applied.

In a natural picture, generally, the pixel change rate does not change abruptly, the pixel change rate does not change greatly in a relatively wide range, or the degree of change in the pixel change rate is low (the change period is long). Accordingly, in the case of the natural picture, a smooth output image with a gradation change is preferable, and the method according to the embodiment is suitable because an enlarged image having an enhanced dynamic change with an overshoot or the like is obtainable.

On the other hand, in a document and illustration, generally, the pixel change rate changes abruptly, and the pixel change rate changes in a relatively wide range, or the change of the pixel change rate is intense (the change period is short). For example, in the enlarged image by the nearest neighbor method, an image without an overshoot or the like and having a distinct boundary like a copy is produced. Therefore, the nearest neighbor method is suitable for the document and illustration image.

With such user setting, the image property analyzer 21 may be omitted, and a hardware amount may be reduced accordingly.

DEFORMATION EXAMPLE 3

In the aforementioned embodiment, the deformation example 1 and the deformation example 2, there have been explained the image processing apparatus and the image processing method for generating an enlarged image in one direction based on the original image. By enlarging the enlarged image of the original image, which is enlarged in either the horizontal direction or the vertical direction, to either the vertical direction or the horizontal direction respectively, the present embodiment may be applied to two-dimensional enlargement processing.

To perform the two-dimensional enlargement processing with the configuration depicted in the embodiment (FIG. 1), for example, with regard to the image data enlarged to the horizontal direction, the pixel disposition in the horizontal direction is rearranged into the pixel disposition in the vertical direction. Namely, after the pixel disposition of enlarged image data, which has been enlarged in one direction, is oppositely rearranged, the enlargement processing is performed for the enlarged image data which is rearranged.

As a method for rearranging the pixel disposition, for example, with the provision of another enlarged image data storage area in the memory 40, which is different from the enlarged image data storage area 42, rearrangement may be performed within the memory 40. Or, by providing an address conversion function for the memory controller 30 or the write transfer controller 14 of the image processing circuit 10, the rearrangement of the pixel disposition may be performed when writing into the enlarged image data storage area 42 during the enlargement processing in one direction.

Figure 13:
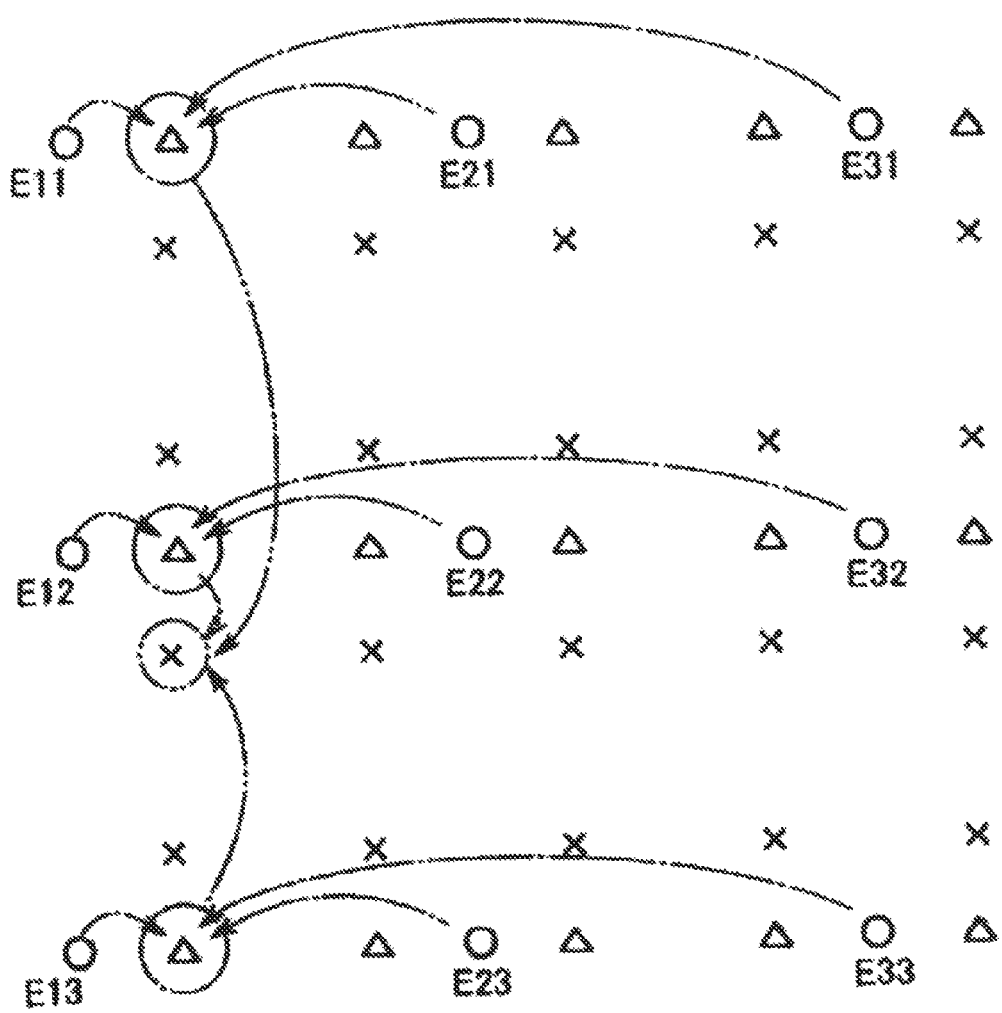
FIG. 13 is an explanation diagram explaining two-dimensional enlargement processing in the deformation example 3.

In FIG. 13, an application of the present embodiment to the two-dimensional enlargement processing is schematically illustrated. Pixel value calculation at arbitrary post-transformed coordinates in the two-dimensional enlargement processing is carried out based on 9 pixels, namely, (3 pixels in the vicinity, including 2 adjacent pixels)×(3 pixels in the vicinity, including 2 adjacent pixels)=9 pixels. Therefore, to roughly compare the calculation amounts in the two-dimensional enlargement processing, a calculation amount ratio of "the nearest neighbor method:the bilinear method:the bicubic method:the present embodiment" is "1:4:16:9".

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention, has been described in detail, it should be understood that the various changes, substitutions, and alterations could be made hereto without departing from the spirit and scope of the invention.

What is claimed is:
1. An image processing apparatus comprising:
   a change rate calculation unit which calculates a first pixel change rate at a first pixel position of an original image and a second pixel change rate at a second pixel position of the original image; and
   a pixel value calculation unit which calculates a pixel value at an interpolation position to be interpolated between the first pixel position and the second pixel position according to an enlargement of the original image, based on the first pixel change rate weighted by a first weight according to the interpolation position and the second pixel change rate weighted by a second weight according to the interpolation position,
   wherein the pixel value calculation unit weighs the first pixel change rate and the second pixel change rate by approximating a transition of a pixel change rate between the first pixel change rate and the second pixel change rate by a linear or an n-order function, with n being a positive integer of 2 or more.
2. The image processing apparatus according to claim 1, further comprising:
   an image property analysis unit which estimates a property of the original image based on a transition of pixel change rates calculated in the change rate calculation unit,
   wherein the pixel value calculation unit selects the linear or the n-order function to be used for approximation, according to an estimation result of an image property by the image property analysis unit.

3. The image processing apparatus according to claim 2, further comprising:
a second pixel value calculation unit which calculates a pixel value at the interpolation position by a nearest neighbor method; and
a third pixel value calculation unit which calculates a pixel value at the interpolation position by a bilinear method,
wherein, any one of the pixel value calculation unit, the second pixel value calculation unit, and the third pixel value calculation unit is selected according to an estimation result of an image property by the image property analysis unit, and a pixel value at the interpolation position is calculated by the any one.

4. The image processing apparatus according to claim 1, further comprising:
a pixel value correction unit which corrects the calculated pixel value into a pixel value based on pixel values of 2 generated pixels adjacent to the interpolation position, when the interpolation position is located within a predetermined distance from a pixel in the original image.

5. The image processing apparatus according to claim 1, further comprising:
a pixel value correction unit which corrects the pixel value calculated in the pixel value calculation unit,
wherein the change rate calculation unit detects an inflection point pixel located at an inflection point at which a sign of a gradient of the pixel change rate changes, and
the pixel value correction unit corrects the calculated pixel value into a pixel value based on pixel values of 2 generated pixels adjacent to the interpolation position, when the interpolation position is located within a predetermined distance from a coordinate of the inflection point pixel or a pixel adjacent to the inflection point pixel in the enlargement direction.

6. The image processing apparatus according to claim 1, wherein an enlarged image obtained by enlarging the original image in a horizontal direction or a vertical direction is enlarged in the vertical direction or the horizontal direction, respectively.

7. The image processing apparatus according to claim 1, wherein the first pixel change rate is determined by a distance between the second pixel position and the interpolation position, and the second pixel change rate is determined by a distance between the first pixel position and the interpolation position.

8. An image processing method comprising:
calculating a first pixel change rate at a first pixel position of an original image and a second pixel change rate at a second pixel position of the original image; and
calculating a pixel value at an interpolation position to be interpolated between the first pixel position and the second pixel position according to an enlargement of the original image, based on the first pixel change rate weighted by a first weight according to the interpolation position and the second pixel change rate weighted by a second weight according to the interpolation position.

wherein the calculating a pixel value comprises weighing the first pixel change rate by the first weight and weighing the second pixel change rate by the second weight, by approximating a transition of a pixel change rate between the first pixel change rate and the second pixel change rate by a linear or an n-order function, with n being a positive integer of 2 or more.

9. An image processing method according to claim 8, further comprising:
estimating a property of the original image based on a transition of pixel change rates calculated in the calculating the first change rate and the second change rate,
wherein the calculating a pixel value comprises selecting the linear or the n-order function to be used for approximation, according to a result of the estimating.

10. The image processing method according to claim 9, further comprising:
calculating a pixel value at the interpolation position by a nearest neighbor method; and
calculating a pixel value at the interpolation position by a bilinear method,
wherein, any one of the calculating a pixel value based on the first pixel change rate and the second pixel change rate, the calculating a pixel value by the nearest neighbor method, the calculating a pixel value by the bilinear method is selected according to a result of the estimating, and a pixel value at the interpolation position is calculated by the any one.

11. The image processing method according to claim 8, further comprising:
correcting the calculated pixel value into a pixel value based on pixel values of 2 generated pixels adjacent to the interpolation position, when the interpolation position is located within a predetermined distance from a pixel in the original image.

12. The image processing method according to claim 8, further comprising:
correcting the pixel value calculated in the calculating a pixel value, wherein the calculating a first pixel change rate and a second pixel change rate further comprises detecting an inflection point pixel located at an inflection point at which a sign of a gradient of the pixel change rate changes,
the correcting comprises correcting the calculated pixel value into a pixel value based on pixel values of 2 generated pixels adjacent to the interpolation position, when the interpolation position is located within a predetermined distance from a coordinate of the inflection point pixel or a pixel adjacent to the inflection point pixel in the enlargement direction.

13. The image processing method according to claim 8, wherein an enlarged image obtained by enlarging the original image in a horizontal direction or a vertical direction is enlarged in the vertical direction or the horizontal direction, respectively.

* * * * *